(12) United States Patent
Medapalli et al.

(10) Patent No.: US 10,587,302 B2
(45) Date of Patent: *Mar. 10, 2020

(54) SYSTEM AND METHODS FOR LOW POWER CONSUMPTION BY A WIRELESS SENSOR DEVICE

(71) Applicant: Cypress Semiconductor Corporation, San Jose, CA (US)

(72) Inventors: Kamesh Medapalli, San Jose, CA (US); Brian Bedrosian, San Carlos, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,247

(22) Filed: Jun. 21, 2019

(65) Prior Publication Data

US 2020/0007183 A1    Jan. 2, 2020

Related U.S. Application Data

(63) Continuation of application No. 16/221,185, filed on Dec. 14, 2018, now Pat. No. 10,367,540.

(60) Provisional application No. 62/632,888, filed on Feb. 20, 2018.

(51) Int. Cl.
*H04B 1/403* (2015.01)
*H04W 52/02* (2009.01)
*H04W 72/04* (2009.01)
*G10L 15/22* (2006.01)
*G10L 15/30* (2013.01)
*G06F 1/3206* (2019.01)

(52) U.S. Cl.
CPC ........... *H04B 1/406* (2013.01); *G06F 1/3206* (2013.01); *G10L 15/22* (2013.01); *G10L 15/30* (2013.01); *H04W 52/0251* (2013.01); *H04W 72/04* (2013.01)

(58) Field of Classification Search
CPC .. H04B 1/406; H04W 52/0251; H04W 72/04; G06F 1/3206; G10L 15/22; G10L 15/30
See application file for complete search history.

(56) References Cited

U.S. PATENT DOCUMENTS

| 6,292,674 B1 | 9/2001 | Davis |
| 8,731,912 B1 | 5/2014 | Tickner et al. |
| 9,620,126 B2 | 4/2017 | Chiba |

(Continued)

OTHER PUBLICATIONS

International Search Report for International Application No. PCT/US19/17767 dated Apr. 8, 2019; 3 pages.

(Continued)

*Primary Examiner* — Dominic E Rego

(57) ABSTRACT

An example system and method operate a wireless device in a first mode with power to operate a communication resource of the wireless device turned off. While operating the wireless device in the first mode, the system and method detects a voice attribute in a first portion of audio data, the audio data based on microphone input. Responsive to the detection of the voice attribute, the system and method transitions to the wireless device to operate in a second mode with power to operate the communication resource turned on. The system and method use the communication resource to establish a wireless connection and communicate packets via the wireless connection, the communicating of the packets based on the audio data.

20 Claims, 12 Drawing Sheets

(56) References Cited

U.S. PATENT DOCUMENTS

| | | |
|---|---|---|
| 2001/0015718 A1 | 8/2001 | Hinckley et al. |
| 2004/0198464 A1 | 10/2004 | Panian |
| 2005/0031148 A1 | 2/2005 | McNary |
| 2008/0208376 A1 | 8/2008 | Jung |
| 2010/0046767 A1 | 2/2010 | Bayley et al. |
| 2014/0270287 A1 | 9/2014 | Park |
| 2014/0302849 A1 | 10/2014 | Palin et al. |
| 2015/0073795 A1 | 3/2015 | Tan |
| 2015/0289124 A1 | 10/2015 | Palin et al. |
| 2015/0382098 A1 | 12/2015 | Aita |
| 2016/0080877 A1 | 3/2016 | Holm et al. |
| 2016/0080896 A1 | 3/2016 | Song et al. |
| 2016/0249140 A1 | 8/2016 | Nikles et al. |
| 2016/0284363 A1 | 9/2016 | Borstel et al. |
| 2017/0105063 A1 | 4/2017 | Huang et al. |
| 2017/0133041 A1 | 5/2017 | Mortensen et al. |
| 2017/0164089 A1 | 6/2017 | Lee et al. |
| 2017/0213552 A1 | 7/2017 | Gupta et al. |
| 2017/0215016 A1 | 7/2017 | Dohmen et al. |
| 2018/0091965 A1 | 3/2018 | Watson et al. |
| 2018/0127265 A1 | 5/2018 | Brioschi et al. |
| 2019/0037321 A1 | 1/2019 | Rasmussen |
| 2019/0074023 A1 | 3/2019 | Jhawar et al. |

OTHER PUBLICATIONS

USPTO Non-Final Rejection for U.S. Appl. No. 16/221,185 dated Mar. 20, 2019; 33 pages.
USPTO Notice of Allowance for U.S. Appl. No. 16/221,185 dated Apr. 15, 2019; 8 pages.
Written Opinion of the International Searching Authority for International Application No. PCT/US19/17767 dated Apr. 8, 2019; 13 pages.

SYSTEM AND METHODS FOR LOW POWER CONSUMPTION BY A WIRELESS SENSOR DEVICE

RELATED APPLICATIONS

The present application is a continuation application of U.S. Non-Provisional application Ser. No. 16/221,185, filed Dec. 14, 2018, which claims the priority benefit under 35 U.S.C. § 119(e) of U.S. Provisional Application No. 62/632,888, filed Feb. 20, 2018, all of which are incorporated by reference herein in their entirety.

TECHNICAL FIELD

The subject matter relates to the field of device connectivity. More specifically, but not by way of limitation, the subject matter discloses techniques for reducing power consumption by wireless sensor devices.

BACKGROUND

Wireless sensor devices perceived to have "always-on" or "always listening" interface capabilities, such as wireless headsets, health monitors, smart speakers, hands-free interfaces, and other wireless sensors, may remain in a powered state to collect sensor data and to wirelessly transmit the collected sensor data to another device. Remaining in a powered state over long periods of time may unnecessarily drain battery power or require an electrical outlet.

BRIEF DESCRIPTION OF THE DRAWINGS

Some embodiments are illustrated by way of example and not limitation in the figures of the accompanying drawings in which.

DETAILED DESCRIPTION

Figure 1:
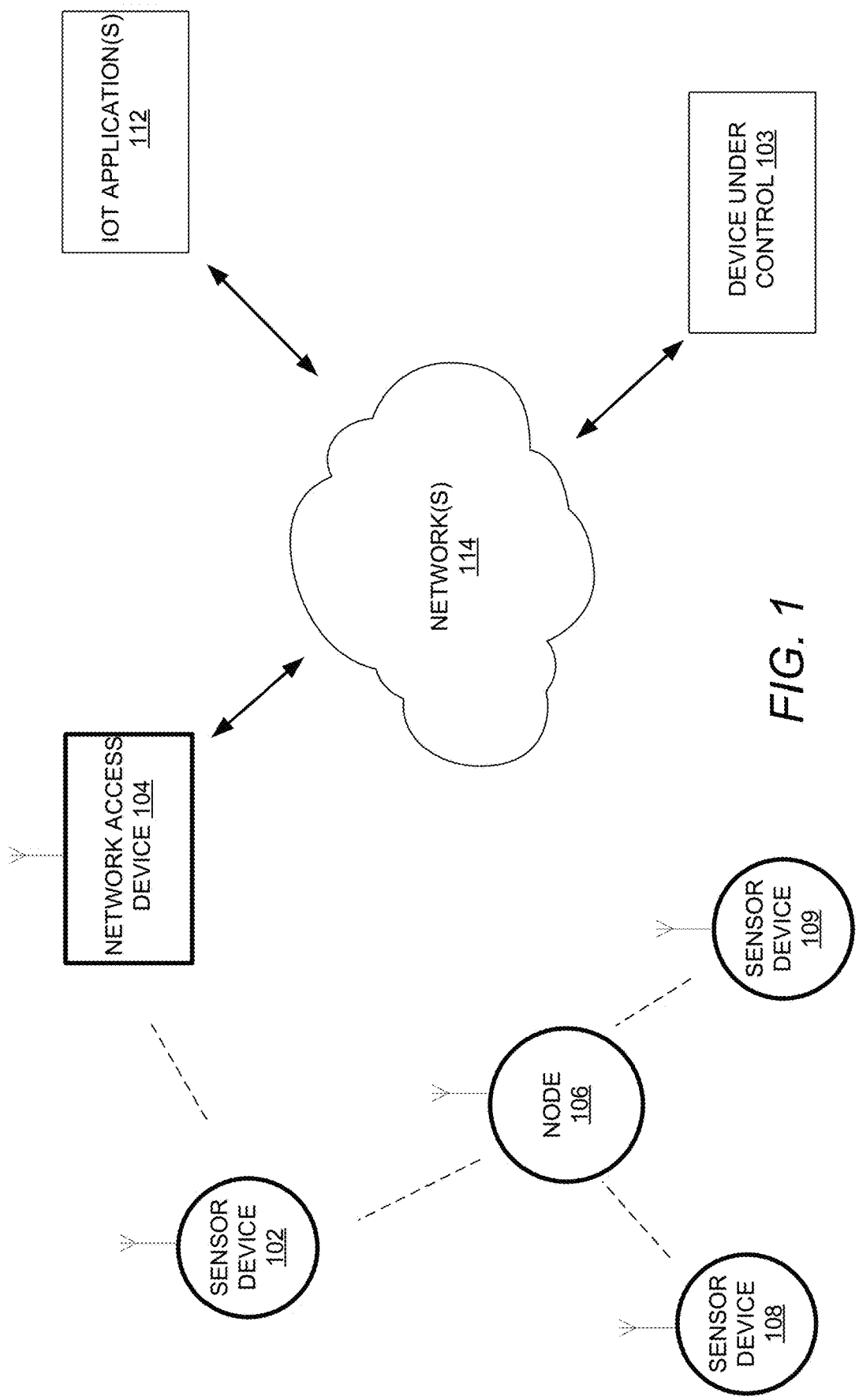
FIG. 1 is a block diagram illustrating sensor devices communicatively coupled to networks through a network access device, in accordance with various embodiments.

Systems and methods for lowering power consumption by wireless sensor devices are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

Smart speakers, hearing aids, voice controlled hubs, mobile phones, white goods, and industrial machinery are examples of Internet of Things (IoT) devices tasked with sensing their surroundings and sharing sensor data. Systems providing "always-on" or "always listening" interface capabilities may include multiple power domains that can each operate in one or more power consumption states. In embodiments, a power domain including communication resources (e.g., transceivers and processing systems used to execute communication protocol code) may remain in a low power consumption mode (e.g., off, hibernate, sleep, etc.) until user speech or other sensor data indicates that a wireless connection is required to transmit packets related to the sensor data. At that point, the power domain is transitioned to a higher power consumption mode to establish the wireless connection and communicate wirelessly.

A wireless headset embodiment described herein includes a power source interface configured to couple with a battery and a microphone to provide audio signals. An integrated circuit (IC) of the wireless headset includes signal processing circuitry to generate audio data based on the audio signals and a processor to operate a phrase detector (PD). The IC includes a power manager coupled to the PD and Bluetooth (BT) circuitry. In embodiments, the wireless headset conserves power that would otherwise be used to communicate until the wireless headset detects speech in the audio data.

In one example, the user utters the wake-up phrase and command to the wireless headset, "Ok helper, turn on the light." Responsive to a detection by the PD of the wake-up phrase in a first portion of the audio data (e.g., the wake-up phrase, "Ok, helper"), the power manager transitions the wireless headset from operation in a first mode, (with battery power to operate the BT circuitry turned off) to operation in a second mode (with battery power to operate the BT circuitry turned on). The operation in the second mode includes use of the BT circuitry to establish a BT Low Energy (BLE) connection and transmit packets, including a second portion of the audio data (e.g., the command, "turn on the light."), for speech recognition via the BLE connection as a BLE Generic Attribute Profile (GATT) server.

Embodiments described herein can reduce power consumed by IoT devices by remaining disconnected from a network until sensor data sensed by the IoT device indicates that a network connection should be established to wirelessly communicate in connection with the sensor data in furtherance of an IoT application. Compared to prior techniques that maintain network connection independent of sensor data indications, embodiments can enable the perception of "always on" or "always listening" functionality by an IoT device with lower power consumption. These and other embodiments are described in further detail herein.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating sensor devices 102, 108, and 109 communicatively coupled to network(s) 114 through a network access device 104, in accordance with various embodiments. Sensor devices 102, 108, and 109 are to sense their surrounding environments and communicate corresponding sensor data with one another and the network access device 104 using any communication protocols known in the art. One or more of the sensor devices 102, 108, and 109 may sense, without limitation, sounds, light, images, temperature, humidity, moisture, device state, bodily functions, etc. for IoT applications which may include those for the smart home, elder care, healthcare, transportation, manufacturing, agriculture, energy management, and/or environmental monitoring.

The node 106 is to relay to the sensor device 102, sensor data originating from the sensor devices 108 and 109. The network access device 104 may process the sensor data and/or forward it to the network(s) 114. In one embodiment, the node 106 and sensor devices 102, 108, 109 are not coupled directly to the network(s) 114 but are coupled to one another and to the network access device 104 through a short range wireless network such as BT, Zigbee, IEEE 802.15.4, and/or a Wi-Fi peer-to peer (p2p) network. One or more of the sensor devices 102, 108, and 109 may rely on batteries to power its sensing and network communication functionality.

In some embodiments, each sensor device 102, 108, 109, the node 106, and the network access device 104 is a node in a mesh network for many-to-many (m:m) device communications. For example, the BLE mesh topology can support a network of tens, hundreds, or thousands of devices that need to communicate with one another. In embodiments, the sensor devices 108 and 109 may be out of range of direct connection with the network access device 104 but sensor data from sensor devices 108 and 109 can still be transferred to the network access device 104 through the node 106 and the sensor device 102. In this way, the sensor device 102 can communicate sensor data to the network access device 104 on behalf of the out of range sensor devices 108 and 109. In some embodiments, sensor data may be efficiently transferred among mesh network nodes on existing mesh network maintenance packets (e.g., sensor data may piggyback on available fields of maintenance packets), which are regularly communicated to maintain the mesh network.

The network access device 104 is to receive sensor data from the sensor device 102 and process the sensor data itself, in support of a particular IoT application, or forward the sensor data through a wired or wireless connection to the network(s) 114 for processing. The network access device 104 may be a multi-network capable access point, beacon, and/or voice controlled hub (VCH). For example, the network access device 104 may connect with the sensor device 102 over a BT network and connect with the network(s) 114 over an Ethernet based network.

Network(s) 114 may include one or more types of wired and/or wireless networks for communicatively coupling the network access device 104, the IoT application(s) 112, and the device under control 103 to one another. For example, and not limitation, network(s) 114 may include a local area network (LAN), wireless LAN (WLAN) (e.g., Wi-Fi, 802.11 compliant), a metropolitan area network (MAN), a wide area network (WAN), a personal area network (PAN) (e.g., BT Special Interest Group (SIG) standard or Zigbee, IEEE 802.15.4 compliant), and/or the Internet.

IoT application(s) 112 are to use the sensor data from the sensor devices 102, 108, 109 in support of an IoT application. As introduced above, example IoT application(s) 112 may include, without limitation, the smart home, elder care, healthcare, transportation, manufacturing, agriculture, energy management, and/or environmental monitoring. IoT application(s) 112 may reside on one or more computing devices coupled to the network(s) 114 and may use or be implemented using processors, memory, circuitry, arithmetic logic, software, algorithms, and data structures to organize and process attributes of sensor data. In embodiments, IoT application(s) 112 operate to recognize patterns of sensor data and associate the recognized patterns with a corresponding meaning. For example, attributes of audio data may include pitch, volume, tone, repeating or rhythmic sounds and/or language sounds such as words, phrases, and the like. In an embodiment, IoT application(s) 112 include Automated Speech Recognition (ASR) technology, which is described further with respect to FIG. 5.

The device under control 103 may include any device with a function that can be initiated responsive to the sensor data. In some embodiments, the network access device 104 controls the device under control 103 based on the results of sensor data processing (e.g., audio pattern recognition) performed by the IoT application(s) 112. Example devices under control may include, without limitation, white goods, thermostats, lighting, automated blinds, automated door locks, automotive controls, windows, industrial controls and actuators. As used herein, devices under control may include any logic, firmware, or software application run by the device under control 103.

In some solutions (e.g., previous solutions), an "always-on," "always listening" sensor device uses its power supply (e.g., battery power) to establish and maintain a network connection with the network access device 104 regardless of whether that sensor device is currently sharing or even has sensor data to share with the network access device 104 or the IoT application(s) 112. In embodiments described herein, before the sensor device 102 uses its power source to establish and/or maintain a network connection with the network access device 104, the sensor device 102 first evaluates whether it has sensor data that will be useful in support of an IoT application. For example, the sensor device 102 may analyze attributes of portions of sensor data for indicators (e.g., speech like sounds, presence detection) that the remainder of the sensor data should be transmitted to the network(s) (114) for use by an IoT application.

In some embodiments, sensor data analysis may be distributed among one or more of the sensor devices 102, 108, and 109. For example, for sounds (e.g., a potential voice command) received through a microphone of the sensor device 108, the decision on whether the sensor device 102 should forward the audio data to the network access device 104 for pattern recognition processing by the IoT applications 112 may be made based on different steps of evaluation provided by the sensor device 108 (e.g., to provide speech onset detection) and the sensor device 102 (e.g., to provide wake phrase detection). An example sensor device that uses its power source to establish and/or maintain a network connection, based on an indication that the sensor data will be useful in support of an application (e.g., an IoT application) is described with respect to FIG. 2.

Figure 2:
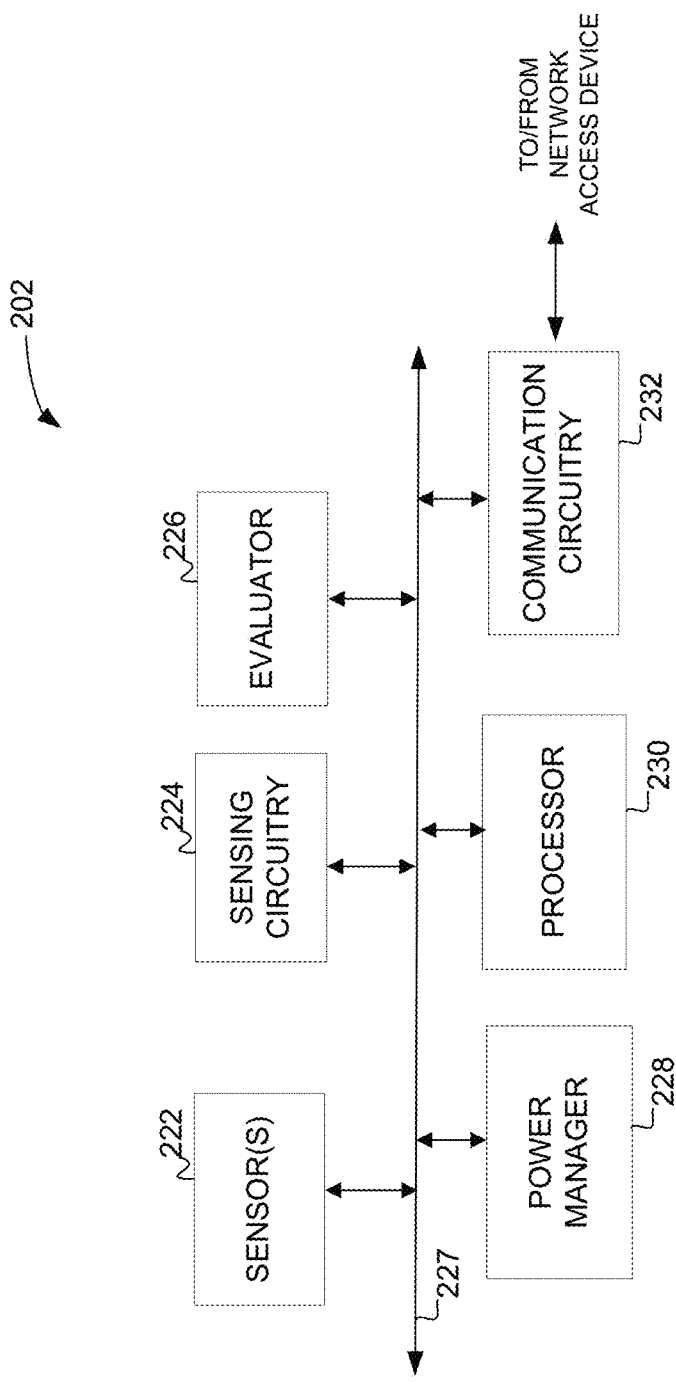
FIG. 2 is a block diagram illustrating a sensor device, in accordance with embodiments.

FIG. 2 is a block diagram illustrating a sensor device 202, in accordance with embodiments. The sensor device 202 is shown to include sensor(s) 222, sensing circuitry 224, evaluator 226, power manager 228, processor 230 and communication circuitry 232 coupled to one another over a bus system 227. The Sensor(s) 222 are to sense attributes of a condition (e.g., a physical condition and/or a state condition) and provide a corresponding analog and/or digital signal. Example sensors may include transducers, image sensors, temperature sensors, humidity sensors, biometric sensors, data sensors, and the like. Sensing circuitry 224 is to measure an analog signal provided by sensor(s) 222 to quantify a sensed condition. Sensor(s) 222 or sensing circuitry 224 may include one or more analog to digital converters to convert analog signals to digital signals. As used herein, sensor data may include an analog and/or a digital signal corresponding to the sensed condition.

The evaluator 226 is to analyze a portion of the sensor data to determine whether the sensor data warrants further evaluation (e.g., for pattern recognition) by a remote device to support an IoT application. If the evaluator 226 determines that such further evaluation is warranted, the evaluator 226 provides a signal to the power manager 228. Power manager 228 is to control power delivery to various power domains of the sensor device 202. In embodiments, the power manager 228 does not deliver power to a power domain including the communication circuitry 232 until after the evaluator 226 determines that sensor data should be further evaluated. The evaluator 226 and/or the power manager 228 may be implemented by hardware (e.g., circuitry), software (e.g., instructions, firmware, code) or a combination of the two. For example, the evaluator 226 and/or the power manager 228 may be code stored in a memory (not shown) and implemented through execution by the processor 230.

Processor 230 may include a memory system (not shown) and include one or more processing devices known by those of ordinary skill in the art, such as a microprocessor or central processing unit, an application processor, a host controller, a controller, special-purpose processor, DSP, an application specific integrated circuit (ASIC), a field programmable gate array (FPGA), or the like. Communication circuitry 232 is to communicate with the sensor devices 102, 108, 109, the node 106, and/or the network access device 104 of FIG. 1. In embodiments, the communication circuitry 232 includes packet processing and radio capabilities to support the wireless communication protocols discussed with respect to FIG. 1.

Figure 3:
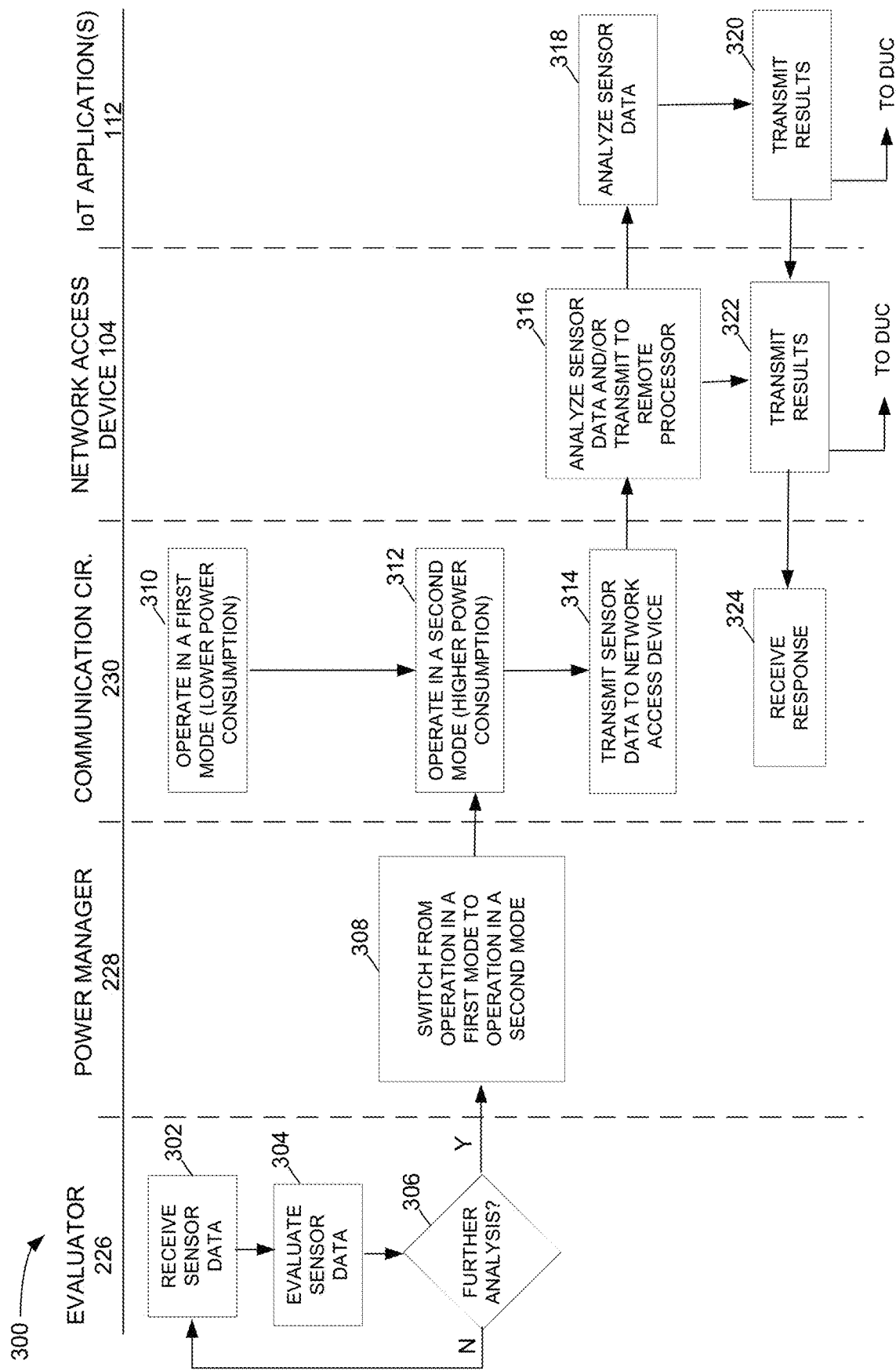
FIG. 3 is a flow diagram illustrating sensor data processing and communication associated with a sensor device, in accordance with embodiments.

FIG. 3 is a flow diagram 300 illustrating sensor data processing and communication associated with the sensor device 202, in accordance with embodiments. The operations shown in FIG. 3 can be performed by processing logic comprising hardware (circuitry, dedicated logic, etc.), software (such as is run on a general-purpose computing system or a dedicated machine), firmware (embedded software), or any combination thereof. In various embodiments, the operations may be performed as shown and described with respect to FIGS. 1 and 2.

At block 302, the evaluator 226 receives sensor data from the sensing circuitry 224. At block 304, the evaluator 226 evaluates the sensor data to determine at block 306 whether the sensor data should be further analyzed by a remote device to support an IoT application. In one embodiment, if the evaluator 226 determines that a value of a portion of the sensor data meets or exceeds a predetermined reference value, the evaluator 226 determines at block 306 that the sensor data warrants further evaluation by a remote device (e.g., the IoT application(s) 112) to support an IoT application. Otherwise, operation returns to block 302. Alternatively or additionally, if the evaluator 226 determines that a portion of sensor data meets or exceeds a predetermined level of similarity to a reference value, the evaluator 226 may determine at block 306 that the sensor data warrants the further evaluation. Otherwise, operation returns to block 302. At block 306, if the evaluator 226 determines that further analysis of the sensor data should be provided and provides a signal to the power manager 228.

At block 308, responsive to the signal from the evaluator 226, the power manager 228 switches the communication circuitry 232 from operating in a first mode at block 310 to operating in a second mode at block 312. In embodiments, the first mode is a lower power consumption mode than the second mode. In the first mode (e.g., off), the power manager 228 may provide little to no power to the communication circuitry 232 for packet processing and radio (e.g., transceiver) operation. In the second mode, the power manager 228 provides enough power to the communication circuitry 232 to transmit the sensor data to the network access device 104 at block 314. In this way, power previously used to constantly maintain a network connection even when not needed, is conserved until sensor data needing processing is ready to be sent. In an embodiment, the transmission at block 314 may be preceded by establishing a network connection and followed by maintaining the network connection to complete additional communications related to the sensor data.

At block 316, the network access device 104 transmits the sensor data (over a second network) to the IoT application 112 for processing or analysis. Alternatively, the network access device 104 may avoid the further transmission by providing the analysis of the sensor data itself. At block 318, the IoT application 112 processes or analyzes the sensor data and at block 320, transmits the results of its sensor data analysis to the device under control 103 and/or back to the network access device 104. At block 322, the network access device 104 transmits the results associated with the processed sensor data to a device under control 103 and/or to the communication circuitry 232 of the sensor device 102, which receives the response at block 324. Particular examples of the embodiments described in FIGS. 1 and 2 are discussed with respect to the remainder of the figures.

Figure 4:
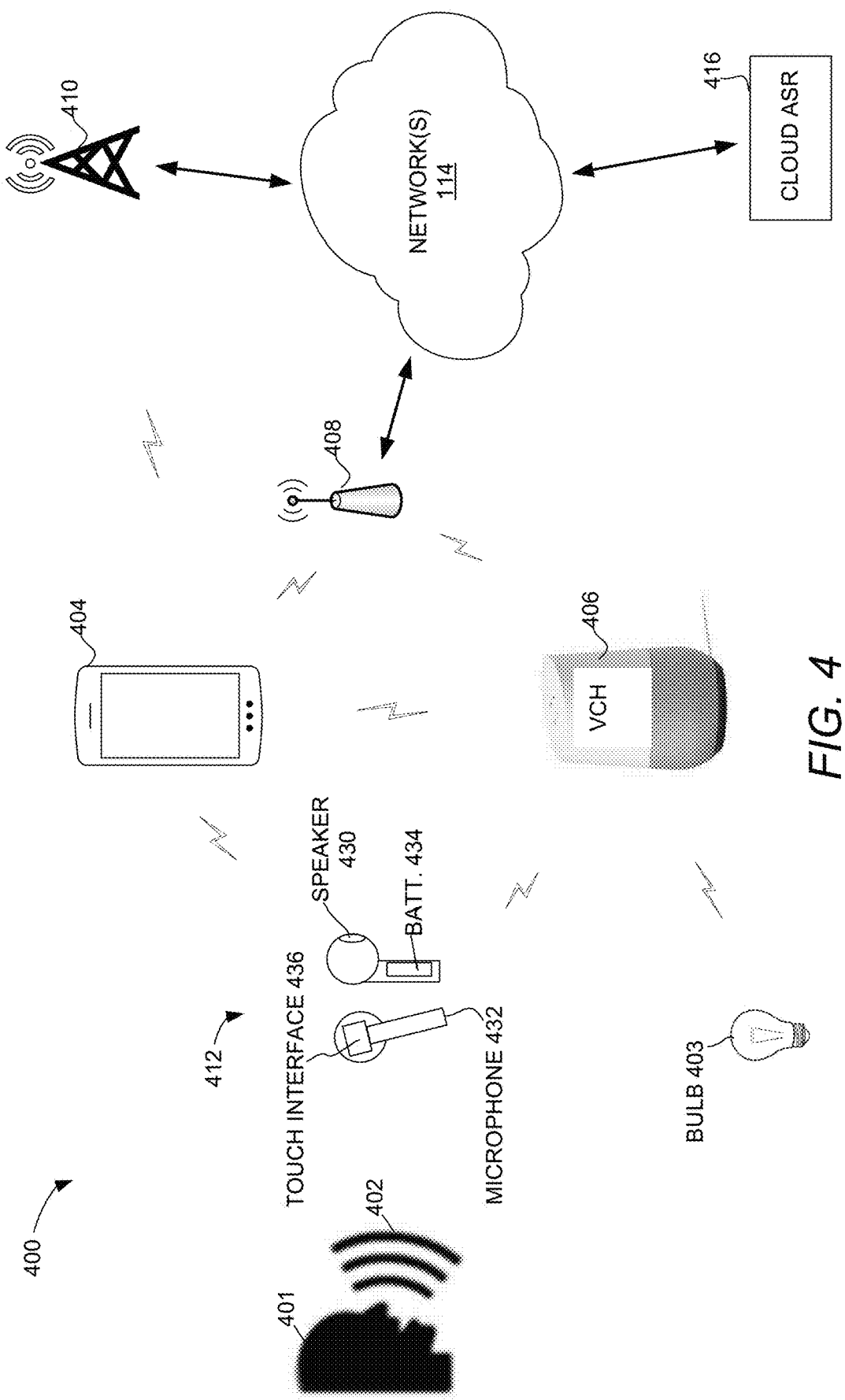
FIG. 4 is a block diagram illustrating a wireless headset communicatively coupled to networks, in accordance with embodiments.

FIG. 4 is a block diagram 400 illustrating a wireless headset 412 communicatively coupled to network(s) 114, in accordance with embodiments. The headset 412, the light bulb 403, mobile device 404, voice controlled hub (VCH) 406, access point 408, cell tower 410, cloud ASR 416 and the network(s) 114 may be communicatively coupled to one another. Any communication networks known in the art may be used to communicate among the various nodes. In one embodiment, the headset 412 couples to the mobile device 404 and/or the VCH 406 via BT network protocol. The mobile device 404 and the VCH 406 may couple to the light bulb 403 via the BT network protocol and couple to the access point 408 via Wi-Fi network protocol. In an embodiment, the headset 412 is coupled to the mobile device 404 in a point to point configuration available on BT Basic Rate/Enhanced Data Rate (BR/EDR) (e.g., classic BT) for audio streaming and BLE for data transfer. The mobile device 404 may also be coupled to the cell tower 410 via cellular communication protocols (e.g., Long-Term Evolution (LTE), 5G). The access point 408 may be coupled to larger Ethernet based networks 114 via wired connection, while the network(s) 114 may couple to the cell tower 410 and the cloud ASR 416.

The headset 412 is shown to include two earpieces each including a speaker 430, a microphone 432, a battery 434, and a touch interface 436. Each feature described with respect to the wireless headset 412 may be included in each earpiece of the wireless headset 412. The headset 412 is to be utilized by a user 401. For example, the user 401 may use the wireless headset 412 to listen to audio played back by the speakers 430 of the wireless headset 412 after the audio has been transmitted to the wireless headset 412 from the mobile device 404 or the VCH 406. The user 401 may also use the microphone 432 and the speakers 430 of the wireless headset 412 to convey sounds for voice calls made by the mobile device 404. In addition, the user 401 may speak a voice command or query into the microphone 432 of the headset 412. The voice command or query is comprised of sounds 402 sensed by the microphone (e.g., audio data).

Figure 5:
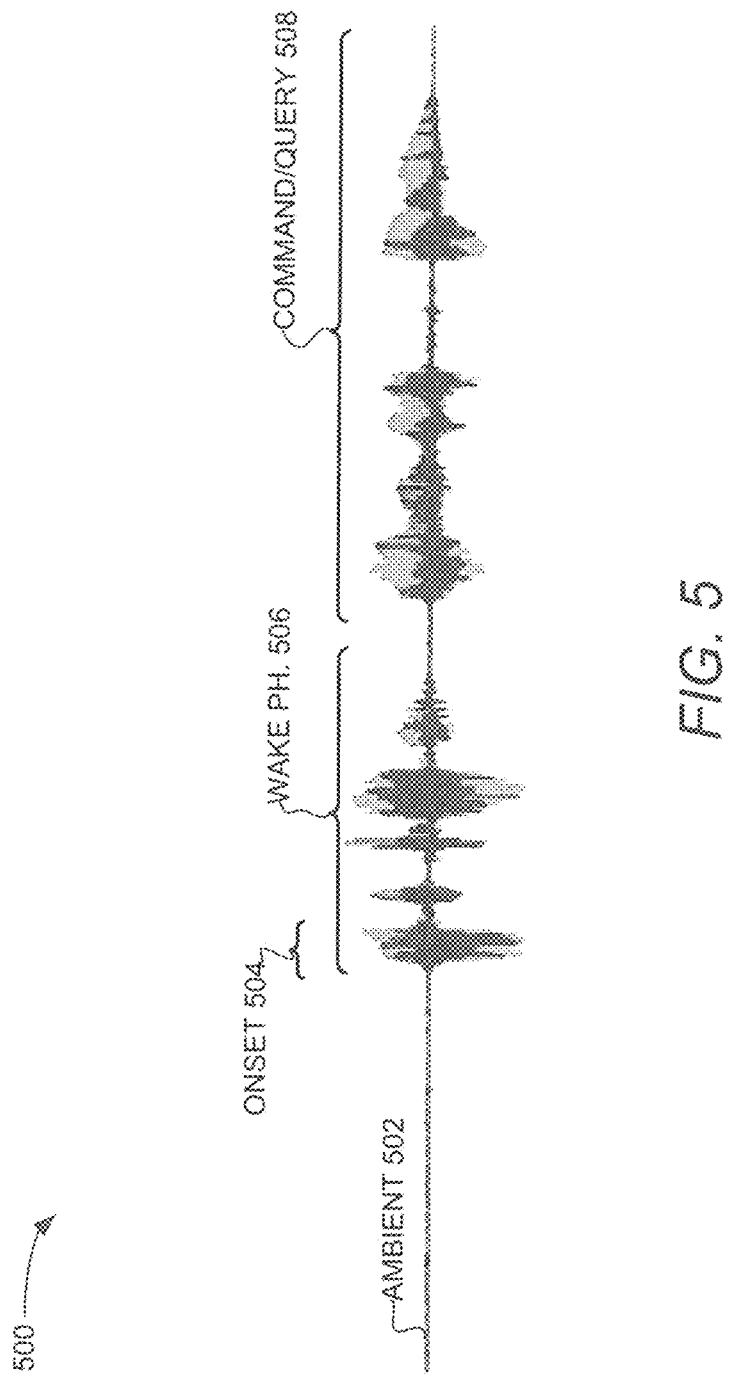
FIG. 5 is a graph diagram illustrating audio data, in accordance with an embodiment.

An example anatomy of audio data evaluated by the headset 412 is discussed in more detail with respect to FIG. 5. As will be discussed in more detail with respect to FIG. 6, the headset 412 may evaluate some of the audio data to determine whether it includes a voice command or query that should be forwarded for interpretation to the mobile device 404 and/or to the cloud ASR 416. If not, battery power to establish or maintain a network connection need not be consumed. If the audio data should be forwarded for interpretation, the headset 412 will use battery power to establish a BT (e.g., a BLE) connection and transfer the audio data to the mobile device 404 and/or the VCH 406.

In embodiment, touch interface 436 is a two-dimensional interface that uses a sensor array to detect presence of a touch and/or fingerprints proximate to the surface of the sensor array. In some embodiments, the user 401 may use the touch interface 436 to control functionality (e.g., on/off, volume control, answer call, end call, etc.) or to gain access to or control the wireless headset 412, the mobile device 404, or a device that is communicatively coupled to the mobile device 404. The battery 434 on each earpiece of the wireless headset 412 is the power source for the circuitry on each earpiece and may be recharged using a suitable charging device.

The mobile device 404 may include any portable wireless communication device. In a particular embodiment, the mobile device 404 is a battery powered smart phone. The VCH 406 may include any portable or fixed wireless communication device. The mobile device 404 and the VCH 406 may be equipped with communication systems capable of communicating using BT communication protocols, Wi-Fi communication protocols, and/or cellular communication protocols. The mobile device 404 and the VCH 406 may each include one or more microphones, speakers, and speech detectors to interpret speech and/or enable network transmission of the audio data for speech recognition. Both the mobile device 404 and the VCH 406 may facilitate a response to the voice commands or queries, and for example, may transmit a signal to the light bulb 403 to turn it on or off in response to an interpreted voice command. In another example, when the voice command involves a query, the mobile device 404 and/or the VCH 406 may each be capable of determining an answer to the query and responding by playing back the answer through its own speakers or providing the answer to the speaker 430 of the headset 412 for playback.

The access point 408 may be a fixed wireless and wired communication device. In an embodiment, the access point 408 includes communication systems to communicate wirelessly (e.g., via Wi-Fi) with the VCH 406 and mobile device 404 and through a wired medium (e.g., Ethernet LAN) with the network(s) 114. Cell tower 410 is to facilitate voice and data communication between the mobile device 404 and other mobile devices (not shown) and may also be coupled to the network(s) 114.

Cloud ASR 416 is to identify predetermined audio patterns and associate them with one another (e.g., using a data structure) and/or with corresponding meaning. Patterns recognizable by Cloud ASR 416 may facilitate, for example and not limitation, music recognition, song recognition, voice recognition, image recognition, and speech recognition, or any other sensed pattern. In embodiments, Cloud ASR 416 may interpret the audio data and provide its results to the mobile device 404, which may act on the results and/or forward the results back to the headset 412.

FIG. 5 is a graph diagram illustrating audio data 500, in accordance with an embodiment. As introduced above, the headset 412 may receive sounds through its microphone 432 and evaluate the audio data 500 to determine whether it should be forwarded to a remote device for speech recognition. The audio data 500 is shown to include ambient noise 502 (e.g., background noise), speech onset 504, a wake phrase 506, and a query or command 508. The ambient noise 502 is audio data that corresponds to background sounds in the environment. The speech onset 504, the wake phrase 506, and the query or command 508 are portions of the audio data 500 that correspond to both the sound waves 402 produced by the user (e.g., the speech to be recognized) and the ambient noise 502. Speech onset 504 is the beginning of speech in the audio data 500 and is shown to be a beginning portion or subset of the wake phrase 506. The wake phrase 506 is a predetermined phrase uttered by a user (e.g., "ok phone"). After having uttered the wake phrase 506, the user utters the query or command 508 (e.g., "turn on the light") to be acted upon (e.g., by the bulb 403 of FIG. 4).

To conserve power, the headset 412 may only attempt detection of the wake phrase 506 if the headset 412 has already detected speech onset 504. Similarly, the headset 412 may only consume power to establish a network connection with the mobile device 404 for subsequent speech recognition when the headset 412 has detected an indication (e.g., speech onset 504, the wake phrase 506 or touch input) that the audio data is a command or query 508. In previous "always listening" solutions, the headset constantly maintains the network connection even when there is no indication that sensed data should be transmitted onto the network for interpretation. There can be significant power consumption involved with the continuous maintenance of a network connection of previous solutions, which can be especially impactful in a battery powered audio processing device.

Figure 6:
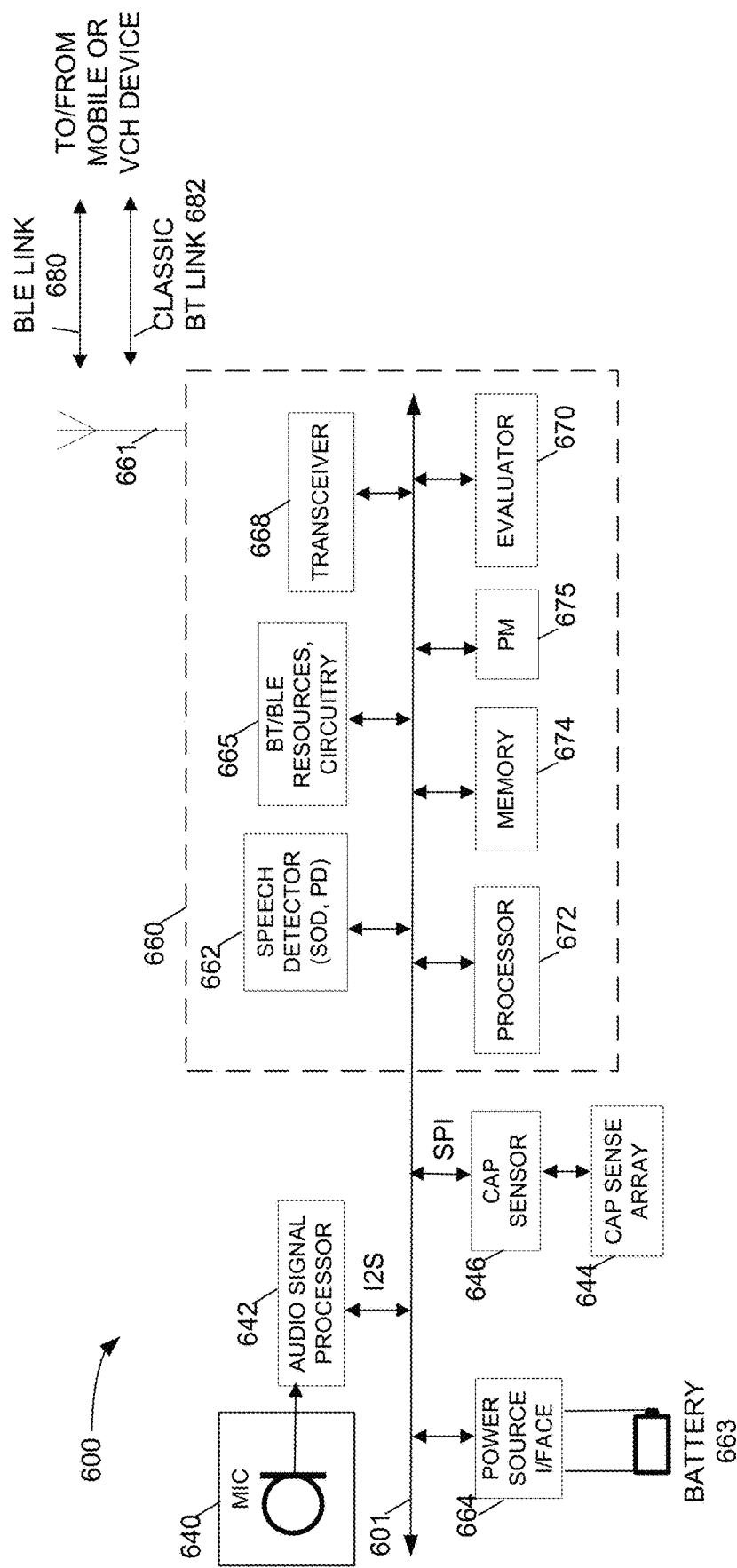
FIG. 6 is a block diagram illustrating an earpiece device of a wireless headset, in accordance with embodiments.

FIG. 6 is a block diagram illustrating an earpiece device 600 of the wireless headset 412, in accordance with embodiments. The functional blocks of the example earpiece device 600 includes a microphone 640, audio signal processor 642, sensor array 644, capacitance sensor 646, power source interface 664, battery 663, and Bluetooth communication IC 660. The Bluetooth communication IC 660 is shown to include speech detector 662, processor 672, memory 674, evaluator 670, power manager 675, BT/BLE resources, circuitry 665, and transceiver 668.

Each functional block may be coupled to bus system 601 (e.g., I2C, I2S, SPI) and be implemented using hardware (e.g., circuitry), instructions (e.g., software and/or firmware), or a combination of hardware and instructions. Although this embodiment shows a set of functional blocks within a BT communication IC 660, in some embodiments, any combination of functional blocks could be implemented on a single integrated circuit substrate or in a single device package without departing from the claimed subject matter. In other embodiments, the functional blocks of the earpiece device 600 are distributed among multiple integrated circuit devices, device packages, or other circuitry.

The microphone 640 is to receive sound waves from its surrounding environment and includes a transducer or other mechanisms (e.g., a including a diaphragm) to convert the energy of the sound waves into electronic or digital signals (e.g., audio data). The microphone 640 may include an array of microphones. In some embodiments, the microphone 640 may be a digital microphone. In some embodiments, the microphone 640 may include threshold/hysteresis settings for activity detection and measurement and/or processing logic to determine whether a sound wave received by the microphone 640 meets or exceeds an activation threshold that gates whether corresponding audio data should be passed on to the speech detector 662 (e.g., discussed below) for processing. In various embodiments, the threshold level of activity may be an energy level, an amplitude, a frequency, or any other attribute of a sound wave. The microphone 640 may be coupled to a memory (not shown) that stores the activation threshold, which may be dynamically reprogrammable.

Audio signal processor 642 includes circuitry to process and analyze the audio data received from the microphone 640. In embodiments, audio signal processor 642 digitizes (e.g., using an analog to digital converter (ADC)) and encodes the electronic audio signals. Once digitized, Audio signal processor 642 may provide signal processing (e.g., demodulation, mixing, filtering) to analyze or manipulate attributes of the audio data (e.g., phase, wavelength, frequency).

In one embodiment, the audio signal processor 642 includes a pulse density modulator (PDM) front end that is connected to the microphone 640. In the PDM front end, the PDM generates a pulse density modulated bitstream based on an electronic signal from the microphone 640. The PDM provides a clock signal to the microphone 640 that determines the initial sampling rate, then receives a data signal from the microphone 640 representing audio captured from the environment. From the data signal, the PDM generates a PDM bitstream and may provide the bitstream to a decimator, which can generate the audio data provided to the bus system 601.

In an alternative embodiment, the audio signal processor 642 includes an auxiliary analog to digital converter (AUX ADC) front end to provide the audio data. In the auxiliary ADC front end, an analog to digital converter converts an analog signal from the microphone 640 to a digital audio signal. The digital audio signal may be provided to a decimator to generate the audio data provided to the bus system 601.

The earpiece 600 may include a sensor array 644 and a capacitance sensor 646 to implement the touch interface 436 of FIG. 4. In one embodiment, the sensor array 644 includes sensor electrodes that are disposed as a two-dimensional matrix (also referred to as an XY matrix). The sensor array 644 may be coupled to pins of the capacitance sensor 646 via one or more analog buses. The capacitance sensor 646 may include circuitry to excite electrodes of the sensor array 644 and conversion circuitry to convert responsive analog signals into a measured capacitance value. The capacitance sensor 646 may also include a counter or timer circuitry to measure the output of the conversion circuitry. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 646 may evaluate other measurements to determine the user interaction. For example, in the capacitance sensor 646 having a sigma-delta modulator, the capacitance sensor 646 is evaluating the ratio of pulse widths of the output, instead of the raw counts being over or under a certain threshold.

The capacitance sensor 646 may include or be coupled to software components to convert the count value (e.g., capacitance value) into a sensor electrode detection decision (also referred to as switch detection decision) or relative magnitude. Based on these count values, the processing logic associated with the capacitance sensor 646 may determine the state of the sensor array 644, such as whether an object (e.g., a finger) is detected on or in proximity to the sensor array 644 (e.g., determining the presence of the finger), tracking the motion of the object, detecting features (e.g., fingerprint ridges and valleys). Alternatively or additionally, the capacitance sensor 646 may send the raw data, partially-processed data, and/or the data indicating the state of the sensor array 644 to the evaluator 670 to evaluate whether that data should be remotely processed to support an IoT application (e.g., remote fingerprint authentication and/or gesture or pattern recognition).

Speech detector 662 is to detect attributes of speech in the audio data 500 and may include a speech onset detector (SOD) and/or a PD stored in the memory 674 and operated by the processor 672. The SOD is to determine whether audio data received from the audio signal processor 642 includes the speech onset 504. In an embodiment, when sounds received by the microphone 640 meet or exceed an activation threshold, the microphone 640 wakes up the SOD to execute a speech onset detection algorithm in order to determine whether speech like signals are present in the audio data. The SOD may use any of the speech onset detection algorithms or techniques known to those have ordinary skill in the art. In an embodiment, audio data with a reduced sample rate (e.g., 2-4 kHz) is sufficient for detecting speech onset (or other sound onset event) while allowing the SOD to be clocked at a lower frequency, thus reducing the power consumption and complexity of the SOD.

Upon detecting a speech onset event, the SOD asserts a status signal on the bus 601 to wake the PD from a low power consumption state (e.g., sleep state) to a higher power consumption state (e.g., active state) to perform phrase detection. The PD is to determine whether the audio data 500 indicated by the SOD includes the predetermined phrase 506 (e.g., a wake-phrase). The PD may include processing pattern recognition algorithms and performing comparisons to expected patterns to determine whether the wake-up word or phrase 506 has been spoken. In embodiments, the PD makes this determination based on the audio data 500 that has been recorded in the memory 674 (e.g., a buffer). Although the speech detector 662 is shown to be implemented on the BT communication IC 660, it may reside on and be implemented by other hardware of the earpiece 600.

The memory 674 may include, for example, random access memory (RAM) and program flash. RAM may be static RAM (SRAM), and program flash may be a non-volatile storage, which may be used to store firmware (e.g., control algorithms executable by processor 672 to implement operations described herein). The processor 672 may be the same or similar to the processor 230 described with respect to FIG. 2. The memory 674 may include instructions or code that when executed perform the methods described herein. Portions of the memory 674 may be dynamically allocated to provide caching, buffering, and/or other memory based functionalities.

The evaluator 670 includes decision logic to evaluate whether the output of the speech detector 662 or the capacitance sensor 646 indicates that the audio data or the touch data, as the case may be, should be processed remotely in support of an IoT application. In an embodiment the evaluator 670 is implemented when the processor 672 executes decision logic code stored in the memory 674. Alternatively or additionally, decision logic may be implemented using hardware. Although the evaluator 670 is shown as a separate functional block, the evaluator 670 may be implemented entirely or in combination with other functional blocks (e.g., the speech detector 662 or the capacitance sensor 646) of the earpiece 600. In embodiments, the evaluator 670 may signal the power manager 675 to power up communication resources when the PD detects the predetermined wake-phrase "Ok, helper" or when the capacitance sensor 646 detects the presence of a finger or fingerprint proximate to the sensor array 644.

Power manager 675 is to control power delivery for operation of BT architecture including, without limitation, the BT/BLE resources 665 and the transceiver 668. The power manager 675 provides power management features that can be invoked by software through power management registers in memory or packet-handling components of the BT architecture. The power manager 675 may automatically adjust power delivery based on user activity. For example, the power manager 675 may generate power-down and power-up control signals for circuitry that executes (e.g., software code) or operates the BT architecture such as the processor 672, the memory 674, and a transmit path, receive path, phase locked loop (PLL), and power amplifier to the transceiver 668. In addition to the power management functionality that is responsive to indications from the evaluator 670, the power manager 675 may support various BT power consumption modes in compliance with BT standards. For example, the power manager may transition the IC 660 to the next lower state after a programmable period of user inactivity. When user activity resumes, the power manager 675 may immediately enter the IC 660 into an active mode.

In an embodiment, the earpiece 600 may use compression and decompression software stored in a memory to reduce the amount of audio data to be transmitted and/or received over network (e.g., BT network) connections. Raw pulse code modulation (PCM) samples from the microphone may also be transmitted over BT connections. For example, the processor 672 may execute the software to code the audio data using the Opus audio format, or any other appropriate codec known by one having ordinary skill in the art. In other embodiments, such audio formatting software may be executed by a microprocessor (not shown) of the earpiece 600 that is not disposed on the BT communication IC 660.

Figure 7:
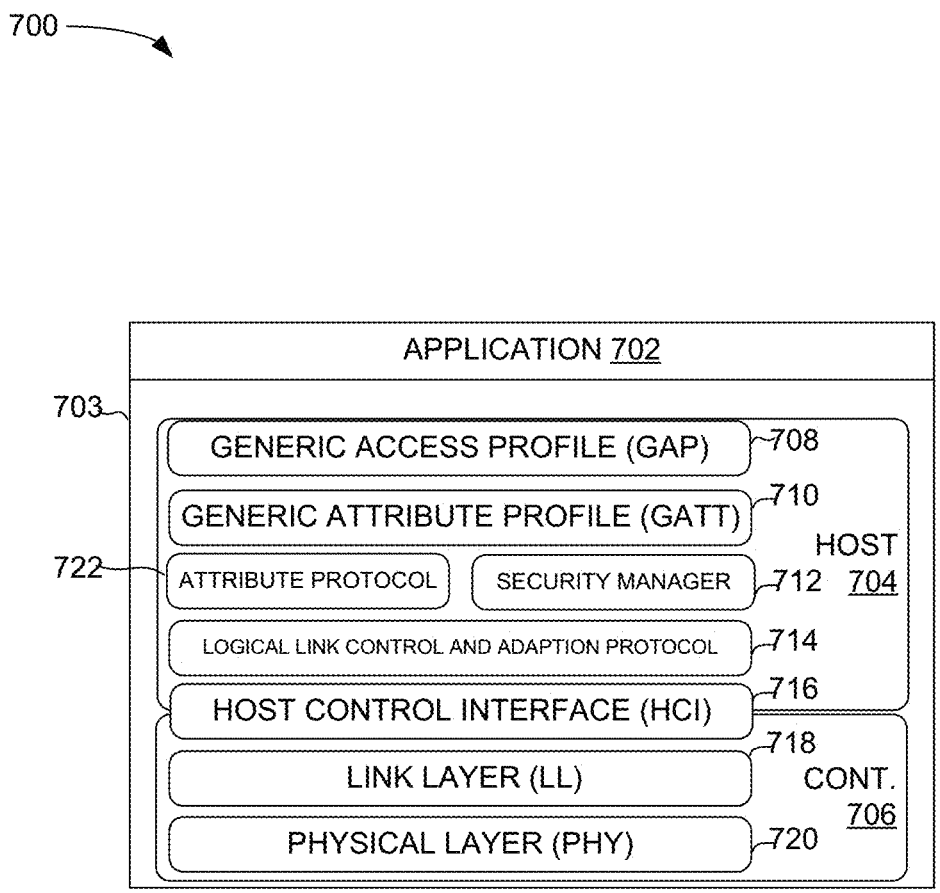
FIG. 7 is a block diagram illustrating a BT architecture, in accordance with embodiments.

BT/BLE resources, circuitry 665 may include BT communication circuitry and code to implement portions of the BT architecture described with respect to FIG. 7. In embodiments, the BT/BLE resources 665 may implement either or both of the BLE and BR/EDR (e.g., classic BT) systems. The transceiver 668 is to couple with an antenna 661 and facilitates transmitting and receiving of radio frequency (RF) signals. In embodiments, when operating as a receiver, the transceiver 668 filters and mixes received RF signals with a local oscillator signal to down-convert the desired frequency (e.g., or channel) to an intermediate frequency. In an embodiment, the down-conversion process provides the intermediate frequency as complex I and Q signals which are sampled and digitized by an analog to digital converter of the transceiver 668. A phase estimator of the transceiver 668 may perform calculations to estimate the phase of the RF signal for the time it was received at the antenna using the I and Q values and forward the phase value to a demodulator of the transceiver, which forwards a decoded sequence of 1s and 0s to the for further processing (e.g., packet processing). When operating as a transmitter, the transceiver 668 generally performs the operations in reverse, receiving a sequence of 1s and 0s from the signal processor, modulating the signal, and outputting an analog signal for transmission by the antenna 661. The Bluetooth communication IC 660 may wirelessly communicate with the mobile device 404 and/or the VCH 406 over a BLE link 680 (e.g., to encode speech data) or classic BT link 682 (e.g., BT Advanced Audio Distribution Profile (A2DP)) to encode streamed audio) via the antenna 661. In embodiments, the transmission energy and transmission range of the earpiece 600 can be adjusted (e.g., dynamically) to provide acceptable performance under the particular noise conditions, interference conditions, and considering the proximity of connected devices.

FIG. 7 is a block diagram illustrating a BT architecture 700, in accordance with embodiments. In embodiments, the application block 702 is the user application running on a device that interfaces with the BT protocol stack 703 of the device. The host 704 includes the upper layers of the BT protocol stack 703 and the controller 706 includes the lower layers. In embodiments, the BT/BLE resources 665 and/or the transceiver 668 implements portions of the host 704 and the controller 706 of BT architecture 700 using processing logic comprising hardware (circuitry, dedicated logic, etc.), software (such as is run on a general-purpose computing system or a dedicated machine), firmware (embedded software code), and/or any combination thereof. The BT protocol stack 703 is used to implement functionality that is compatible with BT specifications including BLE.

In embodiments, the generic access profile (GAP) 708 defines the generic procedures related to discovery of BT devices and link management aspects of connecting to BT devices. The GAP 708 may define the broadcaster role, the observer role, the peripheral role, and/or the central role of the applicable BT specifications.

For BT compatible devices, data may be organized into concepts called profiles, services, and characteristics. A profile describes how devices connect to each other to find or use services and the general expected behavior of a device. A service is a collection of data entities called characteristics. A service is used to define a function in a profile. A service may also define its relationship to other services. A service is assigned a universally unique identifier (UUID). A characteristic includes a value and descriptor that describes a characteristic value. It is an attribute type for a specific piece of information within a service. Like a service, each characteristic is designated with a UUID.

The generic attribute profile (GATT) 710 defines a generic service framework using the attribute protocol (ATT) layer 722. This framework defines the procedures and formats of services and their characteristics. It defines the procedures for service, characteristics, and descriptor discovery, reading, writing, notifying, and indicating characteristics, as well as configuring the broadcast of characteristics. In an embodiment, a GATT client is a device that wants data. It initiates commands and requests towards a GATT server. The GATT client can receive responses, indications, and notification data sent by the GATT server. In an embodiment, the GATT server is a device that has the data and accepts incoming commands and requests from the GATT client and sends responses, indications, and notifications to a GATT client. BT/BLE resources 665 may support both the GATT client and GATT server roles simultaneously. The ATT layer 722 can define a client/server architecture that allows a GATT server to expose a set of attributes and their associated values to a GATT client.

The security manager protocol (SMP) 712 can define the procedures and behavior to manage pairing (e.g., pass key and out of band bonding), authentication (e.g., key generation for device identity resolution), and encryption between devices. The logical link control adaptation protocol (L2CAP) 714 may provide a connectionless data channel and channel multiplexing for the ATT 722, SMP 712 layers and for its own layer. L2CAP 714 may provide segmentation and reassembly of packets as well as flow control between two L2CAP 714 entities (e.g., for transferring large chunks of data).

Host controller interface (HCI) 716 can implement a command, event, and data interface to allow link layer (LL) 718 access from upper layers such as GAP 708, L2CAP 714, and SMP 712. The LL 718 may include link layer circuitry that directly interfaces with the physical layer (PHY) 720 and manages the physical connections between devices. It supports LL 718 states including advertising, scanning, initiating, and connecting (e.g., master and slave). The LL 718 may implement link control procedures including encryption, connection update, channel update, and ping.

Figure 8:
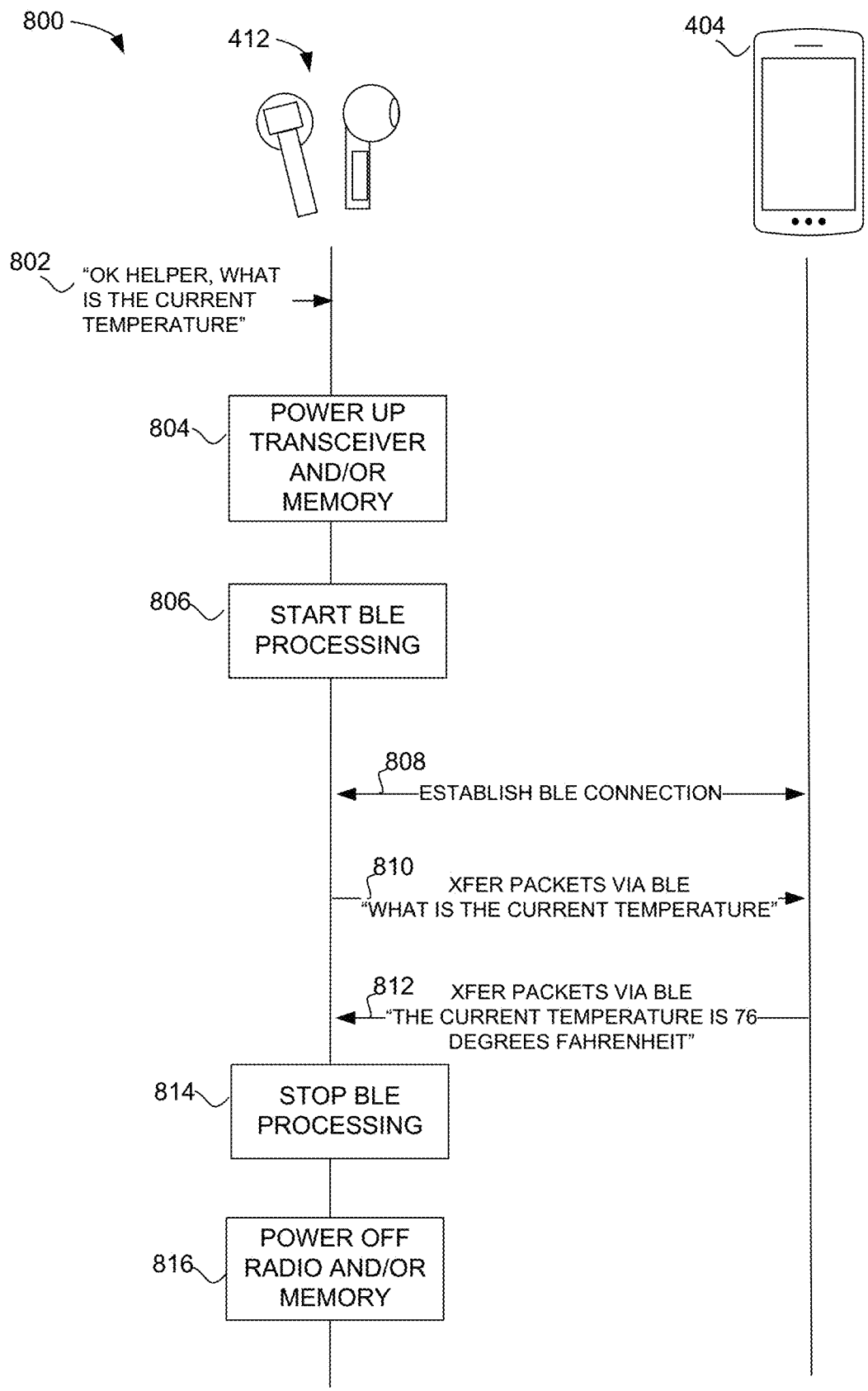
FIG. 8 is an interactive flow diagram illustrating operations of a headset and a mobile device, in accordance with an embodiment.
Figure 9:
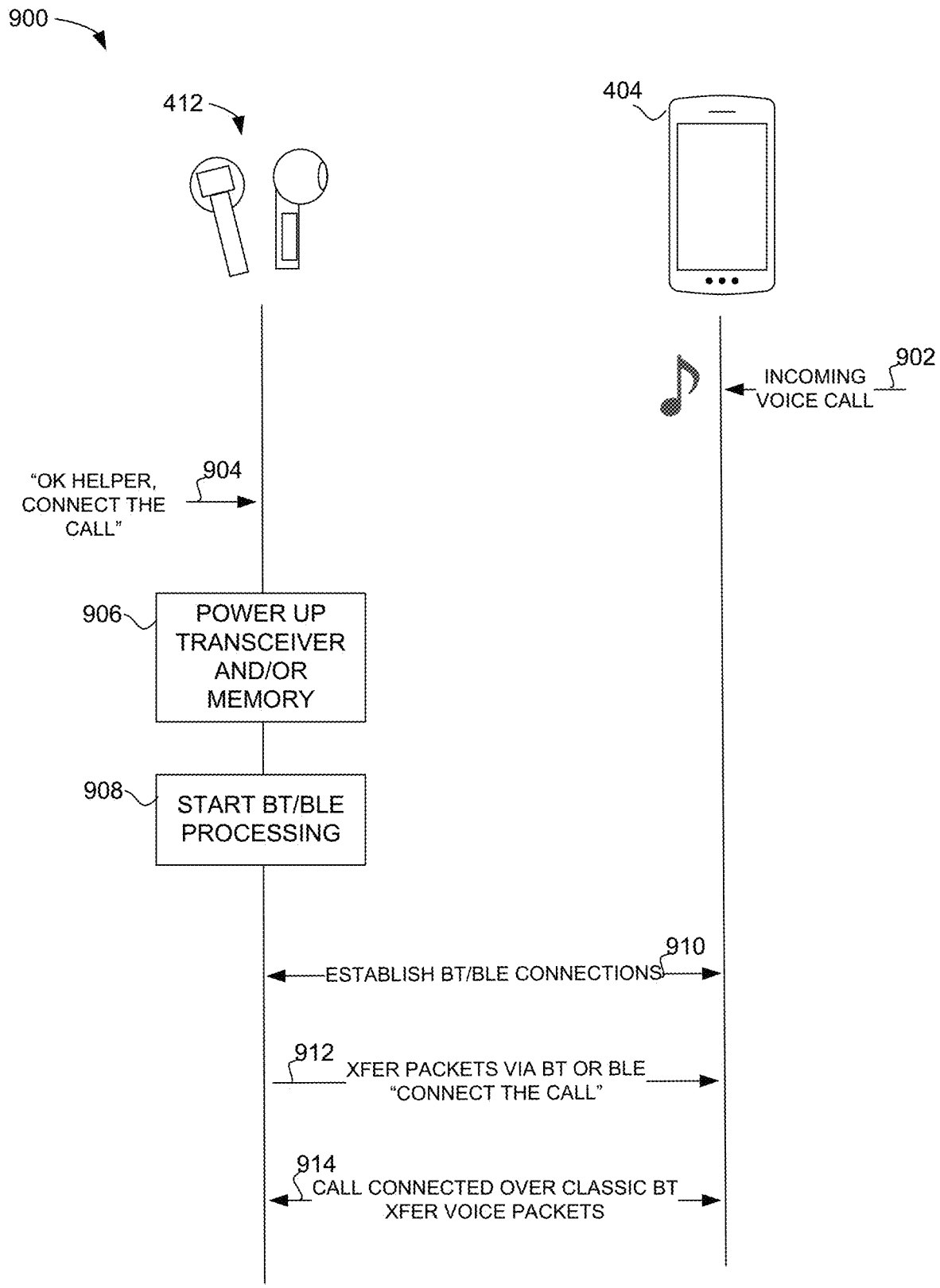
FIG. 9 is an interactive flow diagram illustrating operations of a headset and a mobile device, in accordance with an embodiment.
Figure 10:
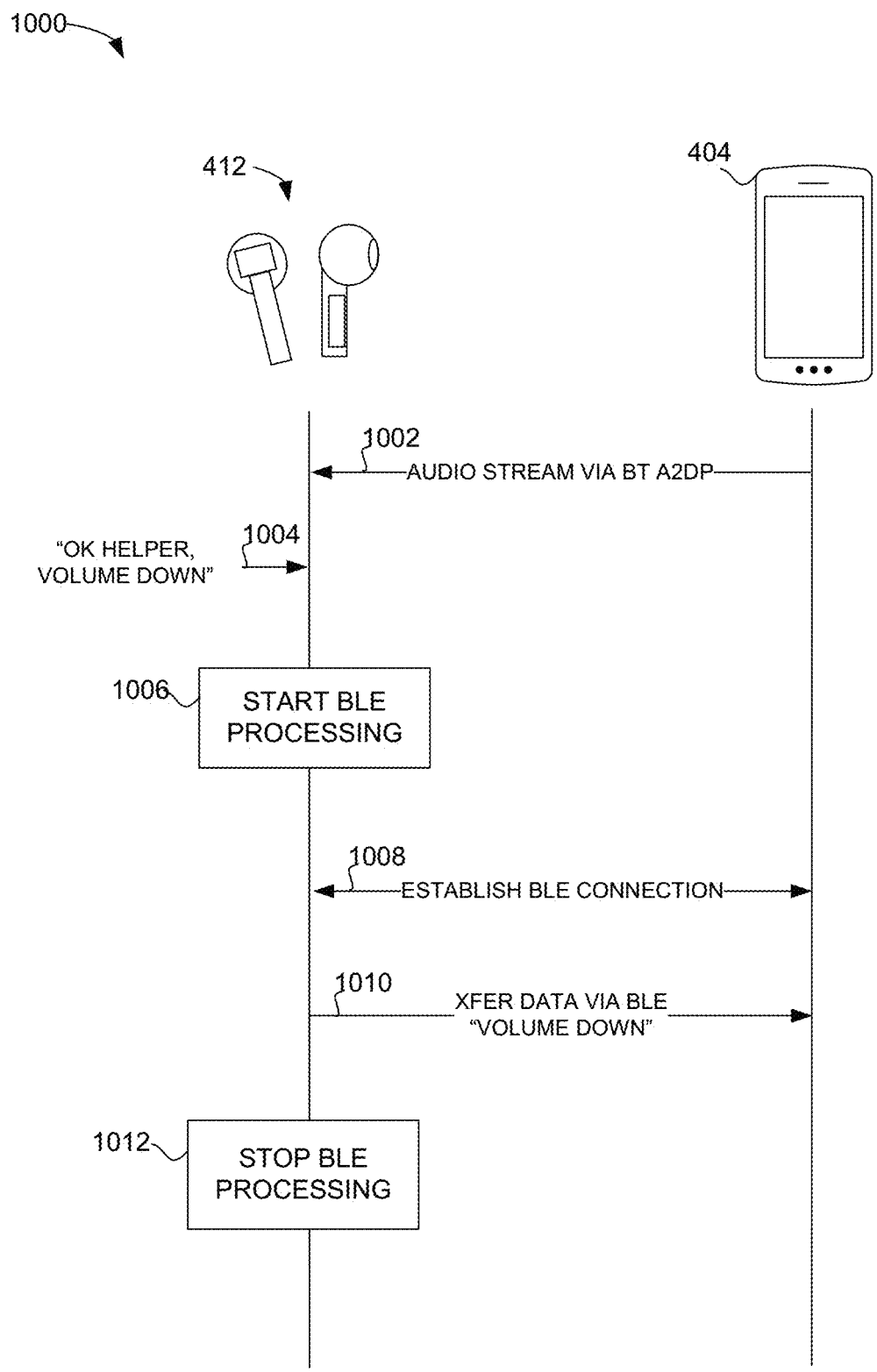
FIG. 10 is an interactive flow diagram illustrating operations of a headset and a mobile device, in accordance with an embodiment.

In embodiments, the PHY 720 includes the analog communications circuitry used for modulating and demodulating analog signals and transforming them into digital symbols. For example, BLE can communicate over 40 channels from 2.4000 GHz to 2.4835 GHz (e.g., using the transceiver 668). In some embodiments, 37 of these channels may be used for connection data and the last three channels (37, 38, and 39) may be used as advertising channels to set up connections and send broadcast data. FIGS. 8-10 discuss techniques for conserving power in BT headsets with speech detection in various example use cases.

FIG. 8 is an interactive flow diagram 800 illustrating operations of the headset 412 and the mobile device 404, in accordance with an embodiment. In this example, the headset 412 is in the user's ears but there is no active audio stream or voice call being communicated. In previous solutions, headsets consume power (e.g., >100 uA) to maintain a sniff connection with the mobile device just to maintain the link, although there is no active session. In embodiments, a sniff connection is not maintained and power to the transceiver 668 and/or memory 674 and the BT/BLE resources 665 are shut off when there is no active session.

At block 802, the speech detector 662 receives the audio data corresponding to the wake-up phrase and query "OK helper, what is the current temperature?" If the speech detector 662 recognizes the wake-up phrase, "OK helper" it signals the power manager 675, which in turn connects power to BT communication resources to power up the transceiver 668 and/or memory 674 at block 804 and to start processing BT/BLE resources 665 at block 806. In an embodiment, touch input, rather than voice input may indicate to the power manager 675 to power the BT communication resources. At 808, the BT/BLE resources 665 establish a BLE connection so that the remainder of the audio data corresponding to the query, "what is the current temperature?" can be transmitted in packets to the mobile device 404 over the BLE connection at 810. At 812, the mobile device 404 is shown to transmit a response to the query, "The current temperature is 76 degrees Fahrenheit." After communications related to the initial query is deemed completed, the power manager 675 may stop processing the BT/BLE resources 665 at block 814 and power off transceiver 668 and/or memory 674 at block 816 to reduce power consumption by BT communication resources.

FIG. 9 is an interactive flow diagram 900 illustrating operations of the headset 412 and the mobile device 404, in accordance with an embodiment. Again, the headset 412 is in the user's ears but there is no active audio stream or voice call being communicated. In embodiments, a sniff connection is not maintained to power the transceiver 668 and/or memory 674 and the BT/BLE resources 665 are shut off when there is no active session.

At block 902, the mobile device 404 receives an incoming request to connect a call and provides a notification to the user (e.g., ringing, vibration, LED). Having perceived the notification of the request to connect, the user may provide an indication to connect the call. At block 904, the speech detector 662 receives the audio data corresponding to the wake-up phrase and command "OK helper, connect the call." If the speech detector 662 recognizes the wake-up phrase, "OK helper" it signals the power manager 675, which in turn connects power to BT communication resources to power up the transceiver 668 and/or memory 674 at block 906 and to start processing BT/BLE resources 665 at block 908. In an embodiment, touch input, rather than voice input may indicate to the power manager 675 to power the BT communication resources. At 910, the BT/BLE resources 665 establish a classic BT or BLE connection so that the remainder of the audio data corresponding to the command, "connect the call," can be transmitted in packets at 912 to the mobile device 404 for interpretation. Alternatively, the speech detector 662 may interpret both the wake-up phrase and the command in which case the headset itself will send a direct command at 912 to connect the voice call. If the classic BT connection has not already been established, it is then established prior to 914 where the voice call is carried out over the classic BT connection.

FIG. 10 is an interactive flow diagram 1000 illustrating operations of the headset 412 and the mobile device 404, in accordance with an embodiment. In this example, the headset 412 is in the user's ears and at 1002, there is an active audio stream being transmitted over a classic BT A2DP connection. In embodiments, BLE resources of the BT/BLE resources 665 are shut off during streaming. Wishing to turn down the sound, the user may provide an indication (e.g., touch or voice command) to do so. At block 1004, the speech detector 662 receives the audio data corresponding to the wake-up phrase and command "OK helper, volume down." If the speech detector 662 recognizes the wake-up phrase, "OK helper" it signals the power manager 675, which in turn connects power to BT communication resources to start processing BLE resources of the BT/BLE resources 665 at block 1006. At 1008, the BT/BLE resources 665 establish a BLE connection so that the remainder of the audio data corresponding to the command, "volume down," can be transmitted in packets at 1010 to the mobile device 404 for interpretation and implementation. Alternatively, the speech detector 662 may interpret both the wake-up phrase and the command in which case the headset 412 itself will send a direct command at 912 to turn down the volume. After communications related to the command is deemed completed, the power manager 675 may stop processing the BLE resources at block 1012 to reduce power consumption by BT communication resources. In one embodiment, rather than transmitting the command, the headset 412 may control volume locally on the headset 412, avoiding power consumption to establish the BLE connection.

Figure 11:
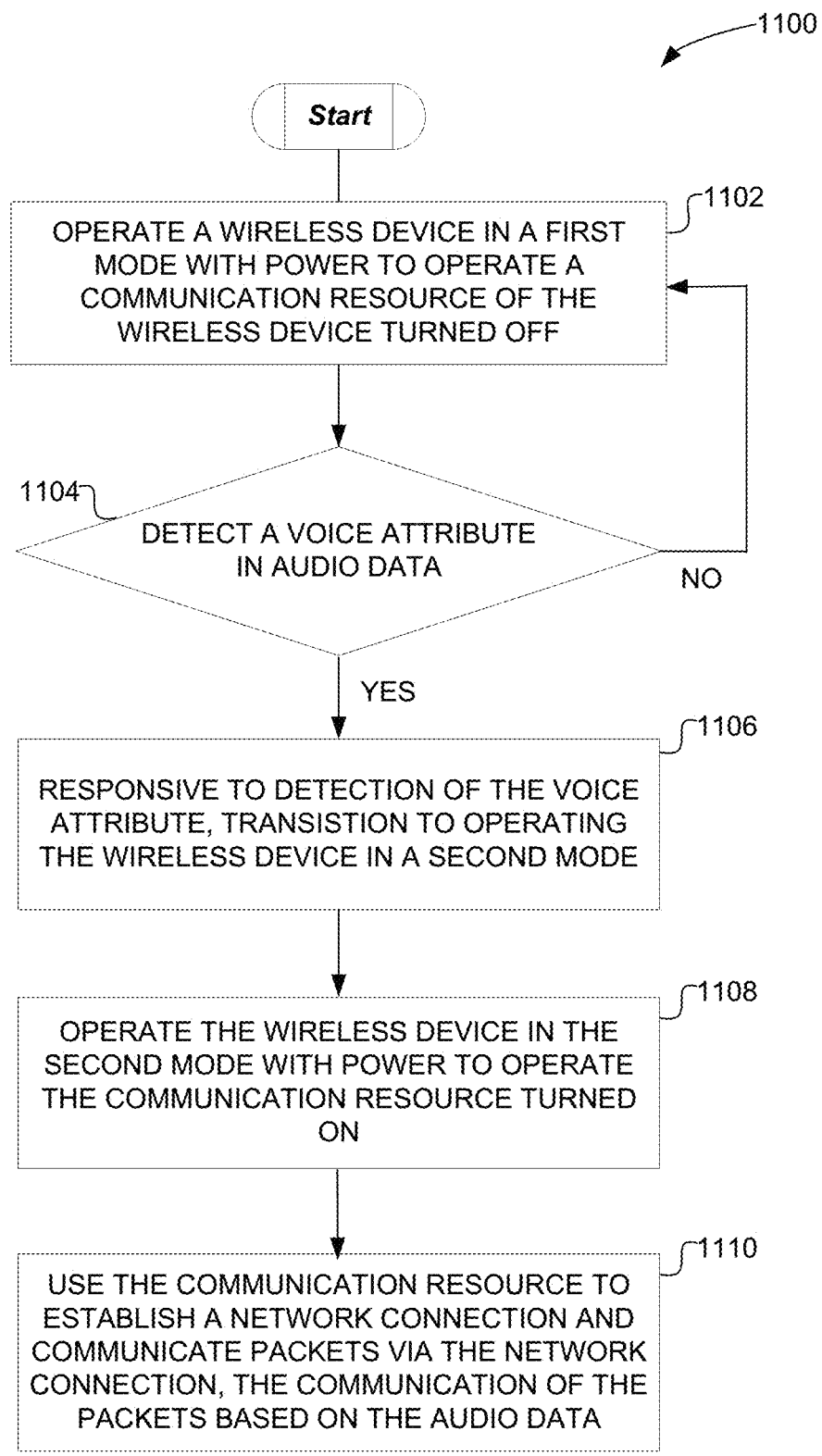
FIG. 11 is a flow diagram illustrating a method of powering a communication resource, in accordance with embodiments.

FIG. 11 is a flow diagram illustrating a method 1100 of powering a communication resource, in accordance with embodiments. The operations shown in FIG. 11 can be performed by processing logic comprising hardware (circuitry, dedicated logic, etc.), software (such as is run on a general-purpose computing system or a dedicated machine), firmware (embedded software), or any combination thereof. In various embodiments, the operations may be performed as shown and described with respect to FIGS. 1-10.

At block 1102, the method 1100 includes operating a wireless device (e.g., the earpiece 600) in a first mode with power to operate a communication resource (e.g., the BT/BLE resources 665) of the wireless device turned off. At block 1104, the method 1100 includes determining (e.g., by the speech detector 662) whether a voice attribute is detected in the audio data. For example, the audio data may be provided by the audio signal processor 642 in response to audio input from the microphone 640. The voice attribute may be speech like sounds detected by a SOD of the speech detector 662 or a phrase (e.g., a wake-phrase portion of the audio data) detected by a PD of the speech detector 662.

At block 1106, the method 1100 includes responsive to detection of the voice attribute, transitioning (e.g., by the power manager 675) to operating the wireless device in a second mode. In embodiments, the transitioning to operating the wireless device in the second mode includes the power manager 675 powering up circuitry (e.g., the processor 672, the memory 674) configured to operate the communication resource (e.g., the BT/BLE resources and/or the transceiver 668). In embodiments, the operating of the wireless device in the first mode with the power turned off consumes less power than the operating of the wireless device in the second mode at block 1108 with the power turned on. The communication resource may include code configured to implement a portion of at least a one of a controller 706 and a host 704 of a BT architecture 700 and the transitioning to operating the wireless device in the second mode comprises starting a processing of the code by circuitry including the processor 672 and the memory 674.

At block 1110, the method includes using the communication resource to establish a network connection and communicate packets via the network connection, the communication of the packets based on the audio data. For example, the BT/BLE resources 665 may establish a BLE connection and with the transceiver 668 transmit packets including the second portion of the audio data (e.g., corresponding to a command or query) via the BLE connection for pattern recognition processing. The communicating of the packets may also include receiving packets including a response to the at least one of the command and the query. In embodiments, the BT/BLE resources 665 may establish the BLE connection with the mobile device 404 while maintaining a classic BT connection with the mobile device 404. Alternatively or additionally, the BT/BLE resource 665 may establish a classic BT connection with the mobile device 404 while maintaining a BLE connection with the mobile device 404. In one embodiment, the BT/BLE resources 665 along with the transceiver 668 communicate the packets via the BT connection as a Generic Attribute Profile (GATT) server to a GATT client.

Thus, embodiments described herein can reduce power consumed by IoT devices by remaining disconnected from a network until sensor data sensed by the IoT device indicates that a network connection should be established to wirelessly communicate in connection with the sensor data in furtherance of an IoT application. Compared to prior techniques that maintain network connection independent of sensor data indications, embodiments can enable "always on" or "always listening" functionality by an IoT device with lower power consumption.

Figure 12:
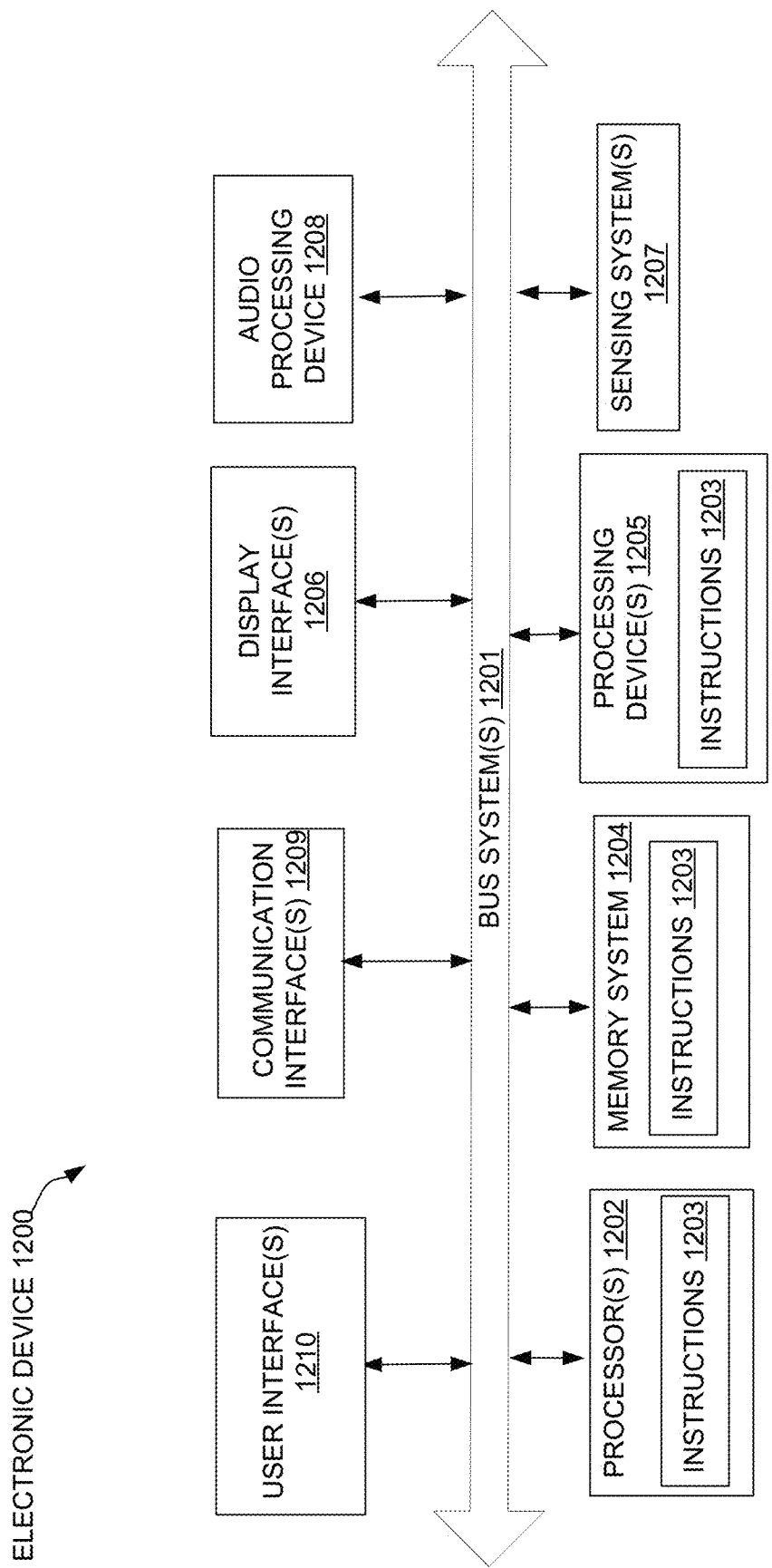
FIG. 12 is a block diagram illustrating an electronic device, in accordance with various embodiments.

FIG. 12 is a block diagram illustrating an electronic device 1200, in accordance with various embodiments. The electronic device 1200 may fully or partially include and/or operate the example embodiments of the sensor device 102, the headset 412, the network access device 104, the mobile device 404, the VCH 406, the device under control, the bulb 403, the IoT application(s) 112, the cloud ASR 416, or the access point 408 of FIGS. 1 and 4. The electronic device 1200 may be in the form of a computer system within which sets of instructions may be executed to cause the electronic device 1200 to perform any one or more of the methodologies discussed herein. The electronic device 1200 may operate as a standalone device or may be connected (e.g., networked) to other machines. In a networked deployment, the electronic device 1200 may operate in the capacity of a server or a client machine in server-client network environment, or as a peer machine in a P2P (or distributed) network environment.

The electronic device 1200 may be an Internet of Things (IoT) device, a server computer, a client computer, a personal computer (PC), a tablet, a set-top box (STB), a VCH, a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 1200 is illustrated, the term "device" shall also be taken to include any collection of machines that individually or jointly execute a set (or multiple sets) of instructions to perform any one or more of the methodologies discussed herein.

The electronic device 1200 is shown to include processor(s) 1202. In embodiments, the electronic device 1200 and/or processors(s) 1202 may include processing device(s) 1205 such as a System on a Chip processing device, developed by Cypress Semiconductor Corporation, San Jose, Calif. Alternatively, the electronic device 1200 may include one or more other processing devices known by those of ordinary skill in the art, such as a microprocessor or central processing unit, an application processor, a host controller, a controller, special-purpose processor, digital signal processor (DSP), an ASIC, a FPGA, or the like. Bus system(s) 1201 may include a communication block (not shown) to communicate with an internal or external component, such as an embedded controller or an application processor, via communication interface(s) 1209 and/or bus system 1201.

Components of the electronic device 1200 may reside on a common carrier substrate such as, for example, an IC die substrate, a multi-chip module substrate, or the like. Alternatively, components of the electronic device 1200 may be one or more separate integrated circuits and/or discrete components.

The memory system 1204 may include volatile memory and/or non-volatile memory which may communicate with one another via the bus system 1201. The memory system 1204 may include, for example, RAM and program flash. RAM may be SRAM, and program flash may be a non-volatile storage, which may be used to store firmware (e.g., control algorithms executable by processor(s) 1202 to implement operations described herein). The memory system 1204 may include instructions 1203 that when executed perform the methods described herein. Portions of the memory system 1204 may be dynamically allocated to provide caching, buffering, and/or other memory based functionalities.

The memory system 1204 may include a drive unit providing a machine-readable medium on which may be stored one or more sets of instructions 1203 (e.g., software) embodying any one or more of the methodologies or functions described herein. The instructions 1203 may also reside, completely or at least partially, within the other memory devices of the memory system 1204 and/or within the processor(s) 1202 during execution thereof by the electronic device 1200, which in some embodiments, constitutes machine-readable media. The instructions 1203 may further be transmitted or received over a network via the communication interface(s) 1209.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 1200 is further shown to include display interface(s) 1206 (e.g., a liquid crystal display (LCD), touchscreen, a cathode ray tube (CRT), and software and hardware support for display technologies), audio interface(s) 1208 (e.g., microphones, speakers and software and hardware support for microphone input/output and speaker input/output). The electronic device 1200 is also shown to include user interface(s) 1210 (e.g., keyboard, buttons, switches, touchpad, touchscreens, and software and hardware support for user interfaces) and sensing system(s) 1207.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
   operating a wireless device in a first mode with power to operate a communication resource of the wireless device turned off;
   while operating the wireless device in the first mode, detecting a voice attribute in a first portion of audio data, wherein the audio data is based on microphone input;
   responsive to the detecting of the voice attribute, transitioning to operating the wireless device in a second mode;
   operating the wireless device in the second mode with power to operate the communication resource turned on; and
   using the communication resource, establishing a wireless connection and communicating packets comprising a second portion of the audio data including at least one of a command and a query via the wireless connection, the communicating of the packets based on the audio data.

2. The method of claim 1, wherein the detecting of the voice attribute comprises detecting speech onset in the first portion of the audio data.

3. The method of claim 1, wherein the detecting of the voice attribute comprises detecting a phrase in the first portion of the audio data.

4. The method of claim 1, wherein the transitioning to operating the wireless device in the second mode comprises powering up circuitry configured to operate the communication resource, wherein the operating of the wireless device in the first mode with the power turned off consumes less power than the operating of the wireless device in the second mode with the power turned on.

5. The method of claim 4, wherein the communication resource comprises a transceiver.

6. The method of claim 4, wherein the communication resource comprises code configured to implement a portion of at least one of a controller and a host of a Bluetooth (BT) architecture, wherein the transitioning to operating the wireless device in the second mode comprises starting a processing of the code.

7. The method of claim 6, wherein the establishing of the wireless connection comprises establishing a BT Low Energy (BLE) connection and the communicating of the packets comprises transmitting first packets including the second portion of the audio data via the BLE connection for pattern recognition processing of the second portion of the audio data.

8. The method of claim 7, wherein the establishing of the BLE connection comprises establishing the BLE connection with another wireless device while the wireless device is maintaining a classic BT connection with the other wireless device.

9. The method of claim 7, wherein the communicating of the packets comprises receiving second packets via the BLE connection, the second packets comprising a response to the at least one of the command and the query.

10. The method of claim 7, wherein the communicating of the packets via the BLE connection includes communicating the packets as a Generic Attribute Profile (GATT) server.

11. The method of claim 6, wherein the second portion of the audio data comprises a connect call command, the establishing of the wireless connection comprises establishing a classic BT connection, and the communicating of the packets comprises communicating voice call data via the classic BT connection responsive to the connect call command, wherein the voice call data does not include the audio data.

12. An integrated circuit (IC), comprising:
signal processing circuitry configured to provide audio data, wherein the audio data is based on signals from a microphone;
a processor configured to operate a speech detector coupled to the signal processing circuitry;
a power manager coupled to the speech detector; and
communication circuitry coupled to the power manager, wherein responsive to a detection by the speech detector of speech in a first portion of the audio data, the power manager is configured to transition the IC from operation in a first mode, with power to operate the communication circuitry turned off, to operation in a second mode, with power to operate the communication circuitry turned on, wherein the operation in the second mode includes use of the communication circuitry to establish a wireless connection and communicate packets comprising a second portion of the audio data comprising at least one of a command and a query via the wireless connection, wherein the communication of the packets is responsive to the speech.

13. The IC of claim 12, wherein the speech detector comprises at least one of a speech onset detector (SOD) to detect speech onset and a phrase detector to detect one or more predetermined phrases.

14. The IC of claim 12, wherein the communication circuitry comprises at least one of a transceiver and protocol logic, wherein operation of the IC in the first mode with the power turned off consumes less power than operation of the IC in the second mode with the power turned on.

15. The IC of claim 12, wherein the operation in the second mode includes use of the communication circuitry to process code configured to implement a portion of at least one of a controller and a host of a Bluetooth (BT) architecture.

16. The IC of claim 15, wherein the communication circuitry comprises BT communication circuitry used to establish a BT Low Energy (BLE) connection and to communicate the second portion of the audio data via the BLE connection for pattern recognition processing of the second portion of the audio data.

17. The IC of claim 16, wherein the communication of the packets via the BLE connection includes communication of the packets as a Generic Attribute Profile (GATT) server.

18. The IC of claim 15, wherein the communication circuitry comprises BT communication circuitry use to establish a classic BT connection, wherein the BT communication circuitry is configured to communicate voice packets via the classic BT connection responsive to a connect call command of the second portion of the audio data, wherein the voice packets do not include the audio data.

19. A wireless headset, comprising:
a microphone to provide audio signals;
a power source interface configured to couple with a battery; and
an integrated circuit, the integrated circuit comprising:
signal processing circuitry to generate audio data based on the audio signals;
a processor configured to operate a phrase detector;
a power manager coupled to the phrase detector; and
Bluetooth (BT) circuitry coupled to the power manager, wherein
responsive to a detection by the phrase detector of a phrase in a first portion of the audio data, the power manager is configured to transition the wireless headset from operation in a first mode, with power to operate the BT circuitry turned off, to operation in a second mode, with power to operate the BT circuitry turned on, wherein the operation in the second mode includes use of the BT circuitry to establish a BT connection and transmit packets including a second portion of the audio data via the BT connection for speech recognition.

20. The wireless headset of claim 19, wherein the operation in the second mode includes use of the BT circuitry to process code to implement a portion of at least one of a controller and a host of a BT architecture to establish a Low Energy (BLE) connection and transmit the packets including the second portion of the audio data via the BLE connection as a BLE Generic Attribute Profile (GATT) server.

* * * * *